United States Patent [19]

Tsai et al.

[11] Patent Number: 5,243,547
[45] Date of Patent: Sep. 7, 1993

[54] LIMITING PARASITIC SIGNAL COUPLING BETWEEN CONDUCTORS

[75] Inventors: Chi-Taou Tsai, Chandler; Wai-Yeung Yip, Mesa, both of Ariz.

[73] Assignee: Motorola, Inc., Schaumburg, Ill.

[21] Appl. No.: 862,015

[22] Filed: Apr. 1, 1992

[51] Int. Cl.$^5$ .................... G06F 15/20; G06F 15/60
[52] U.S. Cl. .................... 364/578; 364/488; 364/489
[58] Field of Search ............... 364/578, 802, 488, 489, 364/490, 491; 333/1, 23

[56] References Cited

U.S. PATENT DOCUMENTS 4,835,539  5/1989  Paschen .................... 343/700 MS
5,187,451  2/1993  Nakamoto et al. .................... 331/99

OTHER PUBLICATIONS

Guggenbühl, W., "Simulation of Lossless Symmetrical Three Conductor Systems," *IEEE Transactions on Computer-Aided Design*, Jul. 1991, pp. 904-910.

Dinh, T, V, Cabon, B. and Chilo, J. "Modelling the Capacitance of Microstrip Line Using SPICE," *Electronics Letters*, Jan. 16, 1992, pp. 194-196.

Weisshaar, A. et al., "Modeling of Radial Microstrip Bends", *1990 IEEE MTT-S Digest*, May 1990, pp. 1051-1054.

*Primary Examiner*—Jack B. Harvey
*Assistant Examiner*—Brian M. Buroker
*Attorney, Agent, or Firm*—Joe E. Barbee; Robert F. Hightower

[57] ABSTRACT

A plurality of conductors (10, 11, 12, 15) are formed into sections (13, 14, 16, 17, 18, 19) having uniform cross-sectional area. Per unit electrical parameters are developed for each section (13, 14, 16, 17, 18, 19). A conductor of the plurality of conductors (10, 11, 12, 15) is partitioned into a number of equal length segments. All other conductors are partitioned into the same number of segments. For each segment, a lumped element model (24, 26, 28, 29) is developed. The model (24, 26, 28, 29) includes a capacitor (33), an inductor (32), a plurality of mutual inductors (36, 38, 31), and a plurality of mutual capacitors (37, 39, 40). Each model (24, 26, 28, 29) of a conductor (10, 11, 12, 15) is serially connected to provide an equivalent circuit (23, 27) of each conductor (10, 11, 12, 15). The circuits (23, 27) are simulated to determine the amount of signal coupling. The conductors (10, 11, 12, 15) are then modified to limit the signal coupling to desired values, and the procedure is repeated.

13 Claims, 3 Drawing Sheets

LIMITING PARASITIC SIGNAL COUPLING BETWEEN CONDUCTORS

BACKGROUND OF THE INVENTION

The present invention relates, in general, to simulation of electrical circuits, and more particularly, to a novel method of reducing electrical coupling between conductors by simulating the electrical coupling.

As technology continually advances, the frequency of signals carried by conductors continues to increase while the spacing between conductors diminishes thereby increasing the conductor's parasitic signal coupling. The coupling often affects reliable operation of electrical equipment by causing variations of the voltage value of electrical signals carried by the equipment's conductors. The effects of parasitic signal coupling have led to a need for accurate computer simulation of such coupling.

A variety of circuit simulation programs and methods previously have been used to simulate parasitic signal coupling. The accuracy of prior simulation tools generally is limited by restrictions such as limiting each conductor being simulated to a single cross-sectional area. Since a conductor's electrical parameters are affected by the conductor's cross-sectional area, prior simulation tools do not accurately predict the effects of parasitic signal coupling. In addition, prior simulation methods typically simulate all conductors as having equal lengths, thereby further reducing simulation accuracy.

Accordingly, it is desirable to have a method of simulating parasitic signal coupling that includes conductors having different lengths, different cross-sectional areas in different sections.

SUMMARY OF THE INVENTION

Briefly stated, the present invention includes forming a plurality of conductors into sections having uniform cross-sectional area. Per unit length electrical parameters are developed for each section. A conductor of the plurality of conductors is partitioned into a number of equal length segments. All other conductors are partitioned into the same number of segments. For each segment, a lumped element model is developed. The model includes a capacitor, an inductor, a plurality of mutual inductors, and a plurality of mutual capacitors. Each model of a conductor is serially connected to provide an equivalent circuit of each conductor.

DETAILED DESCRIPTION OF THE DRAWINGS

Figure 1:
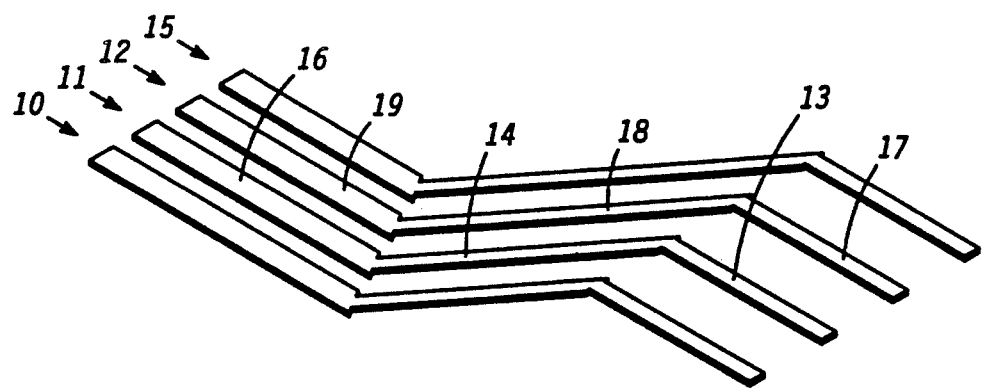
FIG. 1 Illustrates an enlarged perspective view of a plurality of conductors.
Figure 2:
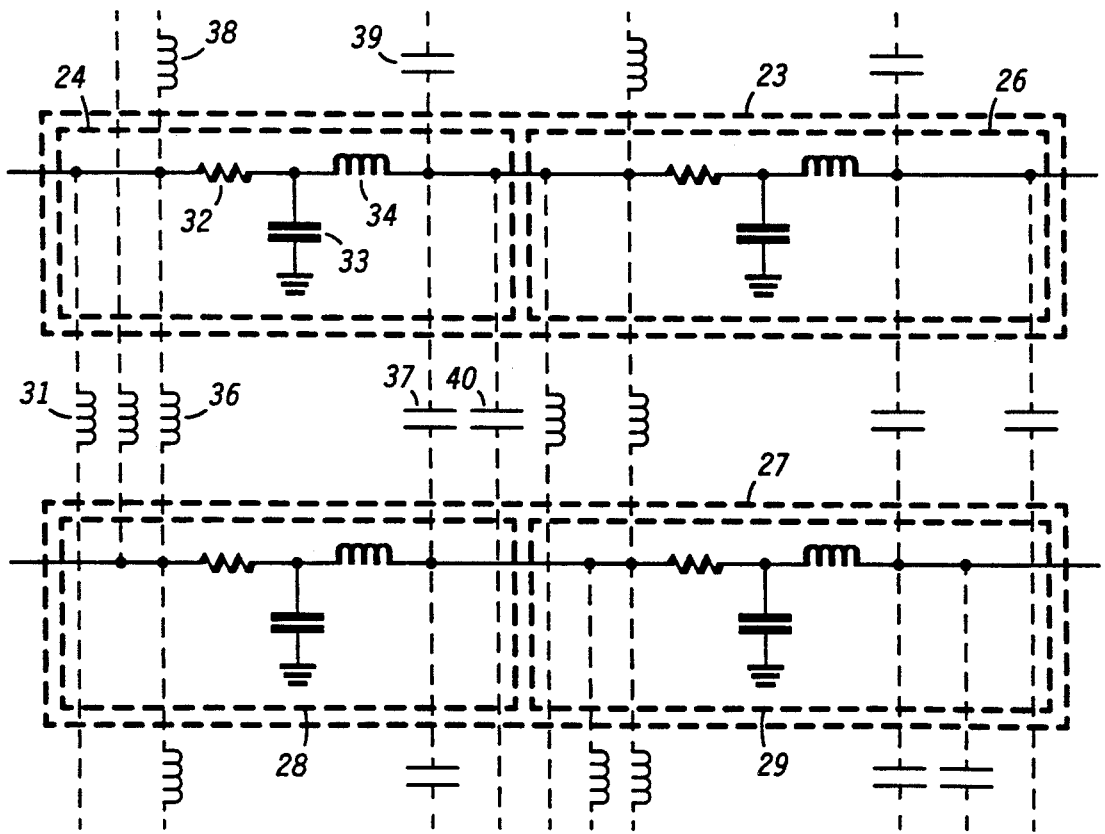
FIG. 2 illustrates an equivalent electrical circuit of a portion of the conductors of FIG. 1 in accordance with the present invention.
Figure 3:
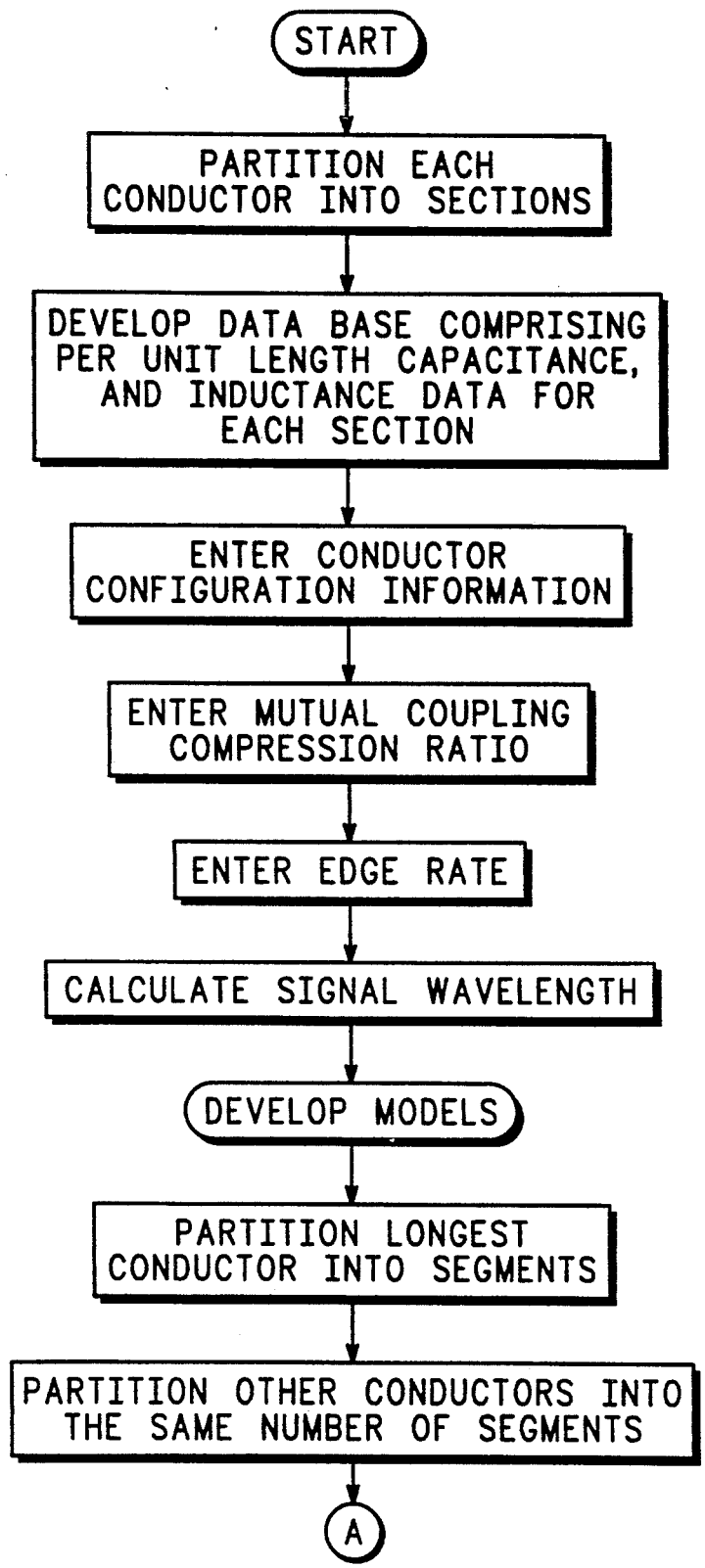
FIG. 3 and FIG. 4 illustrate a flow chart of an embodiment of a method of reducing parasitic signal coupling in accordance with the present invention.
Figure 4:
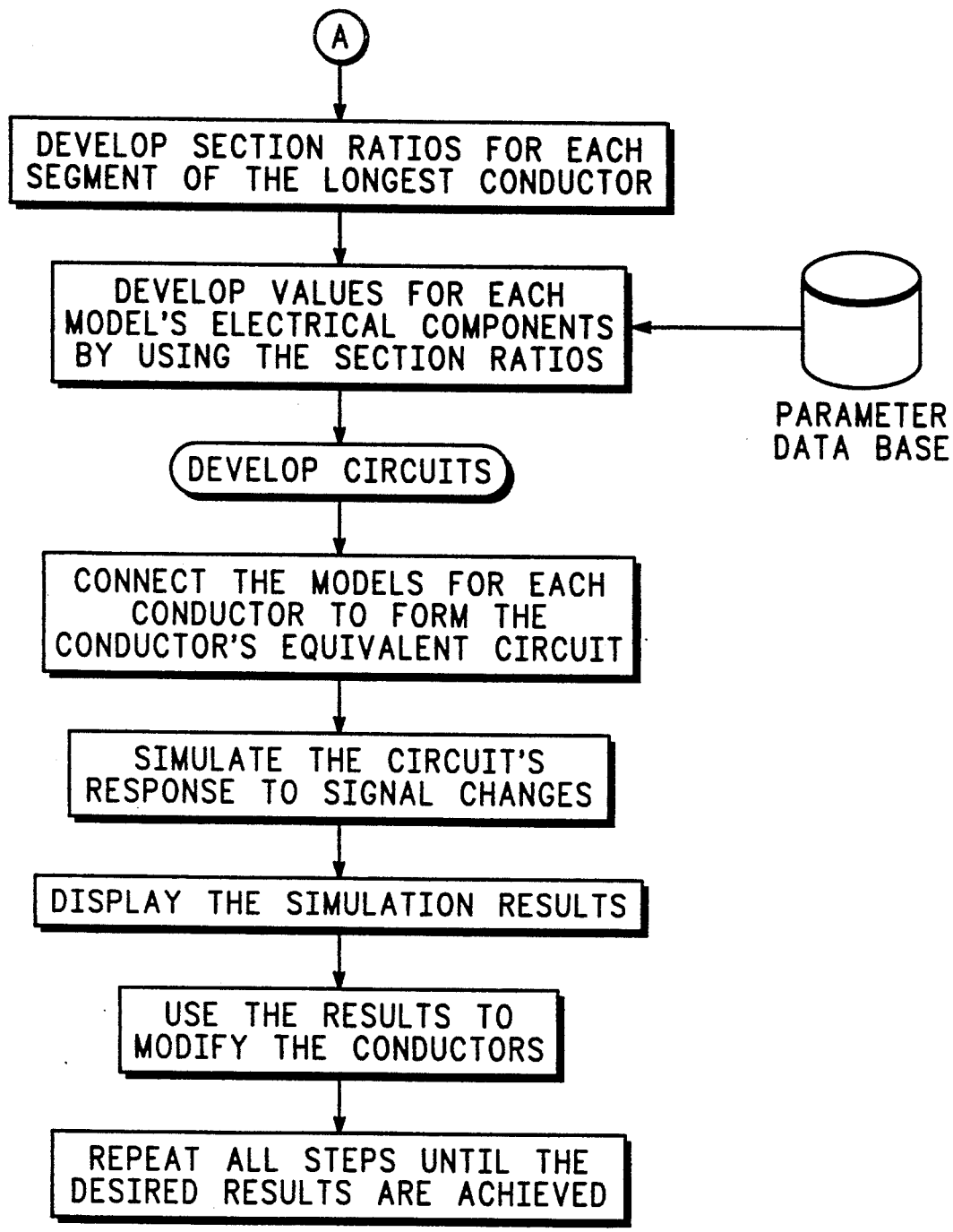

FIG. 1 illustrates a plurality of conductors that could be a portion of the conductors within a semiconductor package, semiconductor die, or other type of electronic equipment. Described hereinafter in FIG. 2, 3, and 4, is a method of limiting the conductors' parasitic coupling to a predetermined value. The method includes forming equivalent circuits for the conductors, simulating the equivalent circuits, and modifying the conductors. The plurality of conductors includes a conductor 10, a conductor 11, a conductor 12, and a conductor 15 which have different cross-sectional areas in different sections of each conductor. For simplicity of explanation, conductors 10, 11, 12, and 15 are illustrated with only three contiguous sections although each conductor may have many sections. Conductor 11 has a first section 13, a second section 14, and a third section 16 wherein each section has a different cross-sectional area and a different length. Similarly, conductor 12 includes a first section 17, a second section 18, and a third section 19 that have different cross-sectional areas and different lengths. Conductors 10 and 15 also have sections of unequal lengths and different cross-sectional areas. In addition, corresponding sections between conductors 10, 11, 12, and 15, e.g. sections 14 and 18, also have unequal lengths and could also have different cross-sectional areas. These different physical characteristics cause each section of the plurality of conductors to have different parasitic inductance and capacitance values which must be included in an accurate parasitic signal coupling evaluation leading to reducing the coupling.

FIG. 2 illustrates an embodiment of a portion of an equivalent electrical circuit that can be used to analyze the plurality of conductors in FIG. 1. For simplicity, only the equivalent circuits of conductors 11 and 12 of FIG. 1 have been illustrated. The description of FIG. 2 includes various references to corresponding FIG. 1 elements to simplify the explanation. Conductor 11 is represented by an equivalent electrical circuit 23 which includes a lumped element model 24 connected in series with a lumped element model 26. Similarly, an equivalent electrical circuit 27 includes a lumped element model 28 and a series connected lumped element model 29 to represent conductor 12.

Because a lumped element equivalent model is valid only if the conductor portion represented by the model has a length that is much less than the wavelength of the signal carried by the conductor, the number of models used for each circuit is determined by the wavelength of the highest frequency signal to be carried by the plurality of conductors. In the preferred embodiment, the number of models used to represent each of the plurality of conductors is determined by dividing the longest conductor into a number of equal length segments wherein each segment has a length that is less than 0.1 times the signal's wavelength. These segments should not be confused with the sections of uniform cross-sectional area shown in FIG. 1. The segments, and therefore the models, may include more than one section. All conductors are then divided into the same number of segments, thus, the same number of models. This ensures that each model accurately represents a segment of a conductor and that the circuit formed by the models accurately represents the conductor. Because the number of models is not a constant, the number of models per conductor shown in FIG. 2 is an example and is not a limitation on the number of models used for each conductor.

Models 24, 26, 28, and 29 contain passive components representing the electrical characteristics of each segment of conductors 11 and 12 in addition to components representing mutual electrical coupling to corresponding segments of other conductors of the plurality of conductors. Model 24 includes a series connected resistor 32 and inductor 34, and a capacitor 33 that is connected from resistor 32 to ground. Resistor 32, inductor 34, and capacitor 33 represent the resistance in addition to the parasitic inductance and capacitance of the first segment of conductor 11. Mutual inductive coupling from the first segment of conductor 11 to a corresponding first segment of conductor 12, to a corresponding first segment of conductor 15, and to a corresponding first segment of conductor 10 is represented by a mutual inductor 36, a mutual inductor 31, and a mutual inductor 38 respectively. Mutual inductors and mutual capacitors are shown as dashed lines to indicate the components represent the effects of mutual coupling and are not actual capacitors or inductors. Mutual capacitive coupling from the first segment of conductor 11 to the first segment of conductor 12, to the first segment of conductor 15, and to the first segment of conductor 10 is represented respectively by a mutual capacitor 37, a mutual capacitor 40, and a mutual capacitor 39. Models 26, 28, and 29 have similar components.

The value of each electrical component of models 24, 26, 28, and 29 is developed from physical characteristics of conductors 11 and 12. Physical electro-magnetic characteristics of sections 13, 14, 16, 17, 18, and 19 (FIG. 1), and other proximinal conductors (i.e. 10 and 45) are used to create per unit length capacitance, inductance, mutual inductance, and mutual capacitance electrical parameters for each section. The physical electro-magnetic characteristics include the shape and material of each section in addition to characteristics of surrounding dielectric material. Such methods of determining electrical parameters are well known to those skilled in the art. The per unit length electrical parameters for sections 13, 14, 16, 17, 18, and 19 are formed into a parameter database so that computer programs can utilize the electrical parameters to form component values for models 24, 26, 28, and 29. One method of obtaining the electrical parameters is to utilize an electro-magnetic (EM) field solver computer program that analyzes the sections and provides the per unit length capacitive, inductive, mutual inductive, and mutual capacitive parameters. Suitable computer programs are well known to those skilled in the art.

In the preferred embodiment, an EM field solver program entitled *Parasitic Parameters* from Pacific Numerix, Inc. of LaJolla, Calif. is utilized. The program creates one set of tables for per unit length inductance and another set for per unit length capacitance for each corresponding group of sections of all conductors. For conductors 10, 11, 12, and 15 there will be three inductance tables, one for each group of corresponding sections, and three corresponding capacitance tables. The per unit length inductance table for one group of corresponding sections, such as those corresponding to sections 13 and 17, of conductors 10, 11, 12, and 15 has a format of:

|           | CONDUCTOR |    |    |    |
|-----------|-----------|----|----|----|
| CONDUCTOR | 10        | 11 | 12 | 15 |
| 10        | A         | B  | C  | D  |
| 11        | E         | F  | G  | H  |
| 12        | J         | K  | L  | M  |
| 15        | N         | O  | P  | R  | where diagonal terms A, F, L, and R represent the parasitic inductance of a section of conductors 10, 11, 12, and 15 respectively, and off diagonal terms represent mutual inductance between the conductors' sections. For example, B is the mutual inductance between conductors 10 and 11, and E is the mutual inductance between conductors 11 and 10. Since B and E represent the same inductance, the values are equal and either can be used. Such a format is used for convenience of programming.

FIG. 3 and FIG. 4 are a flow chart illustrating an embodiment of a method of achieving a predetermined amount of coupling between a plurality of conductors, such as conductors 10, 11, 12, and 15 of FIG. 1. The flow chart's size necessitated the use of FIG. 3 and FIG. 4 to include all flow chart elements. The partitioning is not intended to indicate any limitations of the method. It will be noted that the sequence of many of the operations illustrated hereinafter in FIG. 3 and FIG. 4 can be rearranged without affecting the illustrated method. The method includes forming an equivalent electrical circuit, such as circuits 23 and circuit 27 of FIG. 2, then analyzing the circuit to determine the amount of coupling, followed by modifying the conductor arrangement and repeating the operations until the desired coupling is achieved. A portion of the operations are performed by a computer system. In the preferred embodiment, sequences under both the headings Develop Models and Develop Circuits are performed by a computer system.

The plurality of conductors of FIG. 11 are partitioned into sections having uniform cross-sectional area. This is typically done by examining drawings of conductor configurations or actual conductor patterns, then tabulating the number of sections, the cross-sectional width and height of each section, and the length of each section. Per unit length inductance and capacitance parameters are developed for each section and formed into the parameter database, as described in FIG. 2.

Once the parameter database is created, conductor configuration information is entered. The conductor configuration information includes the number of conductors to be analyzed, the number of sections within each conductor, and the length of each section. A per unit length resistance value of each section of each conductor is an optionally entered term. The per unit length resistance parameter could be calculated by an EM Field solver program as described for capacitance and inductance parameters in FIG. 2. In the preferred embodiment, a conductor is assumed to have a constant per unit length resistance for all corresponding sections. Consequently, the preferred embodiment has one resistance table for each set of corresponding sections. The preferred embodiment's tables have the same format as shown for the inductance table in FIG. 2 except off diagonal terms are zero. If a resistance value is not entered, the corresponding resistors are eliminated from the lumped element model. It should be noted that portions or all of the conductor configuration information could be formed into another database that is accessed by the computer system or added to the parameter database.

A mutual coupling compression ratio is another optionally entered value that will subsequently be used to reduce simulation time by eliminating mutual coupling components that are less than a desired amount.

An edge rate representing the fastest signal transition to be applied to any of the conductors is also entered.

From the edge rate, a signal wavelength is determined as explained in respect to FIG. 2. The wavelength is used to partition the longest conductor into a number of equal length segments as described hereinbefore. The other conductors are divided into the same number of segments and a lumped element equivalent model is created for each segment. The resistance, capacitance, inductance, mutual inductance, and mutual capacitance values for the components of each model are calculated from the per unit length electrical parameters of each section that are in the parameter database. The conversion from per unit length electrical parameters for each physical section to component values for a segment is accomplished by establishing section ratios for each segment. These section ratios correlate the physical section information to the electrical models for each segment. Each section ratio defines the percent of each section of the longest conductor included in the segment, thus, each section ratio indicates the portion of each section included in a particular segment. The section ratios of the longest conductor then are used to correlate corresponding sections of other conductors into segments.

For example, FIG. 2 shows conductor 11, assumed to be the longest conductor for this example, divided into two equal length segments, thus, two models (models 24 and 26). The first segment may contain all of section 13 and one-third of section 14. The second segment may contain the remaining two-thirds of section 14 and all of section 16. Conductor 12 is then divided into the same number of segments, two, a third segment and a fourth segment. The third segment includes all of section 17 and one-third of section 18, while the fourth segment includes two-thirds of section 18 and all of section 19.

Electrical component values are then determined by multiplying the section ratio times the corresponding section length times the per unit length electrical parameters for the section. If a component uses values from more than one section, the values are added to form the component value for the segment. This method permits each conductor to be simulated with component values derived from the actual cross-sectional areas and lengths of the conductor and is a significant improvement over prior methods.

Electrical models of wire bonds, circuit interconnect or other circuit elements that are connected to the conductors can also be added to the electrical equivalent circuits. Each wire bond can be represented by an inductor. The inductor can be interconnected to an electrical equivalent circuit of a conductor that has a wire bond. Inductor values are determined from the wire bonds physical characteristics, such as length and diameter. In the preferred embodiment, one of two different wire bond diameters can be used, twenty-five or thirty-three microns. Inductance for these two diameters is calculated from the equations below:

For twenty-five microns, $$L = 0.5744 + (0.4657 \times D) + (0.06224 \times (D)^2);$$

For thirty-three microns, $$L = 0.6322 + (0.4453 \times D) + (0.04833 \times (D)^2).$$

where D is the straight line distance between two points that are connected by the bonding wire.

After each model has been developed for all of the segments, the models for each individual conductor are serially interconnected to form an equivalent electrical circuit of the conductor, such as circuit 23 or 27 of FIG. 2. Cross talk, simultaneous switching noise, and other coupling related characteristics of the plurality of conductors is determined by simulating the equivalent circuits with a circuit simulation program. In the preferred embodiment, the HSPICE simulation program from Meta Software, Inc. of Campbell, Calif. is utilized. Thus, in this preferred embodiment, the resistance, capacitance, inductance, mutual inductance and mutual capacitance values for each component of each equivalent circuit are provided in a format suitable for use with HSPICE. The circuit simulation program analyzes the equivalent circuit and determines the voltage coupled to the conductors in response to applying a signal to the conductors, or in response to simultaneous switching of several signals, or from other sources. The resulting voltage is displayed in tabular, graphic, or other form. The resulting voltage is then used to determine conductor modifications that are required to maintain coupling below a predetermined desired value. Subsequently, the process is repeated to obtain cross talk information on the modified conductor pattern.

Often, it is desirable to reduce the time required to perform a simulation. Typically, some of the mutual coupling component values are small and can be eliminated without seriously affecting the simulation results. Eliminating such values can reduce simulation time. The previously entered mutual coupling compression ratio is employed for this purpose. To determine if a mutual coupling component can be eliminated, the value of the component under evaluation is divided by the mutual coupling compression ratio to develop a decision value. The component under evaluation is connected to two models, one at each end of the component. The decision value is compared to the value of all similar type components connected to each of the two models. If the decision value is less than the largest value from each model, the component corresponding to the decision value is eliminated. The reduced model complexity reduces simulation time. This method of reducing simulation time is a significant improvement over prior methods of analyzing conductor coupling.

By now it should be appreciated that there has been provided a novel method for reducing signal coupling between a plurality of conductors. The method facilitates maintaining coupling by providing accurate simulation of coupling between the conductors. The method forms equivalent electrical component values from the actual physical electrical parameters of each conductor. Consequently, the models include the affects of a conductor's actual cross-sectional area and length thereby providing high accuracy. Simulation speed is increased by providing for selective elimination of insignificant mutual coupling terms and elimination of resistive components. The method can be used for any number of conductors.

We claim:

1. A method of limiting conductor signal coupling comprising:
    partitioning a plurality of conductors into sections having uniform cross-sectional area;
    developing electrical parameters for each section;
    partitioning a first conductor of the plurality of conductors into a number of segments having equal lengths;
    partitioning each other conductor of the plurality of conductors into the number of segments;
    developing a lumped element model for each segment, the lumped element model having an inductor, a capacitor, a plurality of mutual inductors and a plurality of mutual capacitors, wherein the inductor, the capacitor, the plurality of mutual inductors, and the plurality of mutual capacitors have component values derived from the electrical parameters;

forming an equivalent circuit for each conductor by series connecting lumped element models corresponding to segments of the conductor;

simulating a voltage coupled to at least one conductor of the plurality of conductors; and displaying the voltage and using the voltage to modify the plurality of conductors.

2. The method of claim 1 wherein partitioning the first conductor of the plurality of conductors into the number of segments having equal lengths includes entering an edge rate, calculating a wavelength from the edge rate, forming a longest conductor of the plurality of conductors into the number of segments having a length that is less than 0.1 times the wavelength.

3. The method of claim 1 further including entering conductor specification data including a number of conductors comprising the plurality of conductors, a section number representing a quantity of sections comprising each conductor, a length for each section, and a per unit length resistance.

4. The method of claim 1 further including entering a mutual coupling compression ratio, and using the mutual coupling compression ratio for eliminating mutual capacitors and mutual inductors.

5. Within a computer system, a method of generating an equivalent circuit for a plurality of conductors comprising:

providing a plurality of conductors having sections of uniform cross-section area;

entering a conductor number specifying a quantity of conductors comprising the plurality of conductors;

entering a section number specifying a quantity of sections comprising each conductor;

entering a plurality of section length values specifying a length for each section;

providing a parameter database having electrical parameters for each section;

entering a signal edge rate;

determining a wavelength from the edge rate;

partitioning a longest conductor into segments having a segment length not greater than 0.1 times the wavelength;

partitioning other conductors of the plurality of conductors into the number of segments;

generating a lumped element model for each segment of the plurality of conductors, each lumped element model having electrical components including a capacitor, an inductor, a mutual inductor, and a mutual capacitor wherein the electrical components have values determined from the electrical parameters of the parameter database; and forming an equivalent electrical circuit of each conductor by serially interconnecting each equivalent electrical model of each segment of the conductor.

6. The method of claim 5 further including simulating a response of the equivalent electrical circuit to an application of an electrical signal, displaying the response, and modifying the plurality of conductors.

7. The method of claim 5 wherein providing the parameters database includes providing per unit length capacitance, per unit length inductance, per unit length mutual inductance, an per unit length mutual capacitance for each section.

8. The method of claim 5 wherein generating the lumped element model for each segment includes using electrical parameters of at least two sections to generate the electrical component values of the capacitor, the inductor, the mutual inductor, and the mutual capacitor.

9. The method of claim 5 further including entering a mutual coupling compression ration and using the mutual coupling compression ratio to eliminate mutual inductors and mutual capacitors.

10. A method of limiting parasitic signal coupling between conductors comprising:

providing a plurality of conductors;

partitioning each conductor into sections having uniform cross-sectional area;

providing a parameter database having electrical parameters for each section, the electrical parameters including a per unit length capacitance value, a per unit length inductance value, a plurality of per unit length mutual capacitance values, and a plurality of per unit length mutual inductance values;

entering a per unit length resistance;

entering a conductor number specifying a quantity of conductors comprising the plurality of conductors;

entering a section number specifying a quantity of the sections comprising each conductor;

entering a plurality of section length values wherein each section length value specifies a length of each section;

entering an edge rate value establishing an edge rate of an electrical signal;

generating a wavelength from the edge rate value;

partitioning a longest conductor of the plurality of conductors into a number of segments having equal lengths that are less than 0.1 times the wavelength;

partitioning each other conductor of the plurality of conductors into the number of segments;

developing a lumped element model for each segment, each lumped element model having a capacitor, an inductor, a plurality of mutual capacitors, and a plurality of mutual inductors wherein the plurality of mutual capacitors and the plurality of mutual inductors couple the segment to corresponding segments of other conductors of the plurality of conductors and wherein the capacitor, the inductor, the plurality of mutual capacitors, and the plurality of mutual inductors have component values that are developed from the electrical parameters of the parameter database;

forming an equivalent electrical circuit for each conductor of the plurality of conductors by serially interconnecting each lumped element model of each segment of the conductor;

determining an amount of coupling between the plurality of conductors by using a circuit simulation program to simulate a response of each equivalent circuit to an application of a signal to a first conductor of the plurality of conductors for the purpose of determining a voltage value coupled to a second conductor of the plurality of conductors;

displaying the voltage value; and using the voltage value for changing the plurality of conductors for the purpose of maintaining the voltage value below a predetermined value.

11. The method of claim 10 wherein the determining the amount of coupling step includes entering a mutual coupling compression ratio, and using the mutual coupling compression ratio to eliminate mutual inductors and mutual capacitors.

12. The method of claim 10 wherein the developing the lumped element model step includes determining a plurality of section ratios for each segment of the longest conductor, each section ratio defining a percent of each section of the longest conductor that is included in each segment of the longest conductor and using the plurality of section ratios to determine the component values.

13. The method of claim 10 wherein the developing the lumped element model step further includes developing the lumped element model having a resistor wherein a component value of the resistor is determined from the per unit length resistance.

* * * * *

UNITED STATES PATENT AND TRADEMARK OFFICE
CERTIFICATE OF CORRECTION

PATENT NO. : 5,243,547
DATED : September 7, 1993
INVENTOR(S) : Tsai et al.

It is certified that error appears in the above-indentified patent and that said Letters Patent is hereby corrected as shown below:

Column 7, claim 7, line 67, delete "an" and insert therefor --and--.

Signed and Sealed this

Twenty-seventh Day of February, 1996

Attest:

BRUCE LEHMAN

*Attesting Officer*     *Commissioner of Patents and Trademarks*